US012608761B2

(12) United States Patent
Li et al.

(10) Patent No.: US 12,608,761 B2
(45) Date of Patent: Apr. 21, 2026

(54) SELF-SUPERVISED MULTIMODAL STRUCTURED ILLUMINATION MICROSCOPIC RECONSTRUCTION METHOD AND SYSTEM

(71) Applicant: INSTITUTE OF BIOPHYSICS, CHINESE ACADEMY OF SCIENCES, Beijing (CN)

(72) Inventors: Dong Li, Beijing (CN); Chang Qiao, Beijing (CN); Xingye Chen, Beijing (CN); Quan Meng, Beijing (CN)

(73) Assignee: Institute of Biophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 19/343,976

(22) Filed: Sep. 29, 2025

(65) Prior Publication Data

US 2026/0024162 A1 Jan. 22, 2026

Related U.S. Application Data

(63) Continuation of application No. PCT/CN2024/084788, filed on Mar. 29, 2024.

(30) Foreign Application Priority Data

Mar. 30, 2023 (CN) .......................... 202310325238.0

(51) Int. Cl.
*G06K 9/00* (2022.01)
*G01N 21/64* (2006.01)
(Continued)

(52) U.S. Cl.
CPC ....... *G06T 3/4053* (2013.01); *G01N 21/6428* (2013.01); *G06T 3/20* (2013.01);
(Continued)

(58) Field of Classification Search
CPC ................. G06T 3/4053; G06T 3/4046; G06T 2207/20084; G06T 2207/20221;
(Continued)

(56) References Cited

U.S. PATENT DOCUMENTS 5,828,849 A * 10/1998 Lempel ................ H04N 19/649
382/248
7,215,731 B1 * 5/2007 Basu ...................... G06T 11/006
378/4
(Continued)

FOREIGN PATENT DOCUMENTS

CN 110349237 A 10/2019
CN 111402210 A 7/2020
(Continued)

OTHER PUBLICATIONS

International Search Report and Written Opinion for corresponding application PCT/CN2024/204788, mailed Jun. 25, 2024 (English and Chinese language document) ( pages).
(Continued)

*Primary Examiner* — Alex Kok S Liew

(57) ABSTRACT

A self-supervised multimodal structured illumination microscopic reconstruction method comprises: exciting a biological sample with structured illumination to obtain J raw fluorescence image sequences, wherein J is an integer greater than or equal to 1, each raw fluorescence image sequence comprises S fluorescence images, S being an integer greater than or equal to 2; generating a training set for each raw fluorescence image sequence among the J raw fluorescence image sequences; training a denoising neural network on the basis of the training set; and performing super-resolution reconstruction on the S fluorescence images in each of the J raw fluorescence image sequences using a standard structured illumination super-resolution reconstruction algorithm to form a super-resolution image, which
(Continued)

is input into the denoising neural network to obtain a final super-resolution reconstructed image.

18 Claims, 7 Drawing Sheets

(51) Int. Cl.

| | |
|---|---|
| *G06T 3/20* | (2006.01) |
| *G06T 3/4053* | (2024.01) |
| *G06T 5/60* | (2024.01) |
| *G06T 5/70* | (2024.01) |
| *G02B 21/16* | (2006.01) |
| *G02B 21/36* | (2006.01) |

(52) U.S. Cl.
CPC ................. *G06T 5/60* (2024.01); *G06T 5/70* (2024.01); *G01N 2021/6439* (2013.01); *G02B 21/16* (2013.01); *G02B 21/367* (2013.01); *G06T 2207/10056* (2013.01); *G06T 2207/10064* (2013.01); *G06T 2207/20081* (2013.01); *G06T 2207/20084* (2013.01); *G06T 2207/30024* (2013.01)

(58) Field of Classification Search
CPC . G06T 2207/20081; G06T 2207/30196; G06T 2207/30221; G06T 3/4076; G06T 5/50; G06T 7/70; G06T 2207/10016; G06T 2207/20016; G06T 3/40; G06T 2207/20064; G06T 2207/20212; G06T 3/4038; G06T 5/60; G06T 5/70; G06T 7/73; G06T 19/20; G06T 2207/10004; G06T 2207/30141; G06T 2219/2016; G06T 3/02; G06T 3/4069; G06T 5/20; G06T 5/92; G06T 7/001; G06T 7/74; G06T 7/75; G06V 10/82; G06V 40/103; G06V 10/764; G06V 10/40; G06V 10/46; G06V 10/761; G06V 10/7715; G06V 10/80; G06V 10/806; G06V 40/193; G06V 10/25; G06V 10/454; G06V 20/64; G06V 40/10; G06V 40/161

See application file for complete search history.

(56) References Cited

U.S. PATENT DOCUMENTS

| | | | | |
|---|---|---|---|---|
| 2019/0121155 | A1* | 4/2019 | Yu | ........................ G06T 3/4053 |
| 2020/0104720 | A1* | 4/2020 | Bao | ...................... G06N 3/045 |
| 2021/0063720 | A1 | 3/2021 | Ma et al. | |
| 2022/0383452 | A1 | 12/2022 | Lu et al. | |

FOREIGN PATENT DOCUMENTS

| | | |
|---|---|---|
| CN | 112950690 A | 6/2021 |
| CN | 113917677 A | 1/2022 |
| CN | 114119421 A | 3/2022 |
| CN | 115272123 A | 11/2022 |
| CN | 115293981 A | 11/2022 |
| CN | 116402681 A | 7/2023 |
| WO | 2021052261 A1 | 3/2021 |
| WO | 2021097916 A1 | 5/2021 |
| WO | 2022111368 A1 | 6/2022 |
| WO | 2023035543 A1 | 3/2023 |

OTHER PUBLICATIONS

Office Action for CN application 202310325238.0, dated Aug. 28, 2024.

Notice of Allowance for CN application 202310325238.0, dated Oct. 24, 2024.

* cited by examiner

Prediction process $y_{i,MN}$ $y_{i,(2m-1)(2n-1)}$ $y_{i,(2m-1)(2n)}$ $y_{i,(2m)(2n-1)}$ $y_{i,(2m)(2n)}$ Training process Prediction process

SELF-SUPERVISED MULTIMODAL STRUCTURED ILLUMINATION MICROSCOPIC RECONSTRUCTION METHOD AND SYSTEM

CROSS REFERENCE TO RELATED APPLICATIONS

The present application is a continuation of International Application No. PCT/CN2024/084788, filed on Mar. 29, 2024, which claims the benefit of and priority to Chinese Application No. 202310325238.0, filed on Mar. 30, 2023, the entire disclosures of which are incorporated herein by reference.

FIELD

The present disclosure relates to a self-supervised structured illumination microscopic reconstruction method and system, and particularly to a self-supervised structured illumination microscopic reconstruction trained using a pixel realigning technology.

BACKGROUND

In the structured illumination microscopy (SIM) technology, a plurality of modulated excitation illuminations (e.g., with sinusoidal Moiré fringes) are used to illuminate a sample. After being reconstructed via specific algorithms, microscopic imaging results with significantly improved resolution—compared to traditional fluorescence microscopy technology—can be obtained, enabling more detailed analysis of microscopic structures. Due to characteristics of fast imaging speed, low phototoxicity, and broad sample applicability, the SIM technology has extremely wide applications in the field of live cell imaging.

However, unlike the traditional fluorescence microscopy technology where the collected raw images are the final visualization results, the super-resolution reconstructed images obtained by the SIM technology need to be obtained from a series of raw images via reconstruction algorithms. These reconstruction algorithms include a plurality of complex steps such as Fourier transform, inverse Fourier transform, frequency domain translation, frequency domain filtering, and frequency domain stitching. Therefore, if there is noise in the raw image, the noise will be significantly amplified in the image processed by the reconstruction algorithms. If the signal-to-noise ratio (SNR) of the raw image is low, the quality of the final super-resolution reconstructed image will be significantly affected, i.e., causing severe reconstruction "artifacts". The existence of "artifacts" seriously impairs the quality of the final super-resolution reconstructed images, making it impossible to distinguish between real sample information and the "artifacts" generated during the reconstruction process, thereby affecting microscopic observation results.

SUMMARY

According to a first aspect of the embodiments of the present disclosure, a self-supervised multimodal structured illumination microscopic reconstruction method is provided, including:

exciting a biological sample with structured illumination to obtain J raw fluorescence image sequences (Y) generated by the exciting of the biological sample, in which J is an integer greater than or equal to 1, in which each raw fluorescence image sequence (Y) includes S fluorescence images, S is an integer greater than or equal to 2, and each fluorescence image has a pixel size of M*N, with M and N being even numbers;

running a program in a computer for each of the J raw fluorescence image sequences (Y), in which the program is configured to:

1) extract, by means of pixel realigning, a first sub-image, a second sub-image, a third sub-image, and a fourth sub-image each with a pixel size of $(M/2)*(N/2)$ from an $i^{-th}$ fluorescence image $(y_i)$ among the S fluorescence images, in which a two-dimensional (2D) pixel matrix $y_{i,(2m-1)(2n-1)}$ of the first sub-image, a 2D pixel matrix $y_{i,(2m-1)(2n)}$ of the second sub-image, a 2D pixel matrix $y_{i,(2m)(2n-1)}$ of the third sub-image, and a 2D pixel matrix $y_{i,(2m)(2n)}$ of the fourth sub-image are selected from a 2D pixel matrix $y_{i,\ MN}$ of the $i^{-th}$ fluorescence image $(y_i)$ respectively, where m is an integer and m=1, 2, 3, . . . , M/2, and n is an integer and n=1, 2, 3, . . . , N/2;

2) perform 2× pixel upsampling on the first sub-image, the second sub-image, the third sub-image, and the fourth sub-image to obtain a first upsampled sub-image, a second upsampled sub-image, a third upsampled sub-image, and a fourth upsampled sub-image each with a pixel size of M*N;

3) perform a pixel translation of [0.5, 0.5] on a 2D pixel matrix of the first upsampled sub-image to obtain a first 2D subpixel translated sub-image; perform a pixel translation of [−0.5, 0.5] on a 2D pixel matrix of the second upsampled sub-image to obtain a second 2D subpixel translated sub-image; perform a pixel translation of [0.5, −0.5] on a 2D pixel matrix of the third upsampled sub-image to obtain a third 2D subpixel translated sub-image; and perform a pixel translation of [−0.5, −0.5] on a 2D pixel matrix of the fourth upsampled sub-image to obtain a fourth 2D subpixel translated sub-image;

4) group S first 2D subpixel translated sub-images obtained from the S fluorescence images into a first sub-image group, group S second 2D subpixel translated sub-images obtained from the S fluorescence images into a second sub-image group, group S third 2D subpixel translated sub-images obtained from the S fluorescence images into a third sub-image group, and group S fourth 2D subpixel translated sub-images obtained from the S fluorescence images into a fourth sub-image group;

5) perform SIM reconstruction on the first sub-image group, the second sub-image group, the third sub-image group, and the fourth sub-image group using a standard SIM algorithm, to obtain a first super-resolution sub-image, a second super-resolution sub-image, a third super-resolution sub-image, and a fourth super-resolution sub-image respectively; and 6) select two different super-resolution sub-images from the first super-resolution sub-image, the second super-resolution sub-image, the third super-resolution sub-image, and the fourth super-resolution sub-image to form a super-resolution image pair for training, and incorporate the super-resolution image pair for training into a training set; and running a program in a computer, where the program is configured to:

1) 7) train a denoising neural network based on the training set; and 2) 8) perform super-resolution reconstruction on the S fluorescence images in each of the J raw fluorescence image sequences (Y) using a standard structured illumination super-resolution reconstruction algorithm, to form a super-resolution image, in which the super-resolution image is input into the denoising neural network to obtain a final super-resolution reconstructed image.

According to a second aspect of the embodiments of the present disclosure, a self-supervised multimodal structured illumination microscopic reconstruction system is provided, including:

a super-resolution reconstruction module, configured to perform super-resolution reconstruction on an image using a standard structured illumination super-resolution reconstruction algorithm; and a denoising module, including a denoising neural network;

in which the self-supervised multimodal structured illumination microscopic reconstruction system is configured to:

excite a biological sample with structured illumination to obtain J raw fluorescence image sequences (Y) generated by exciting of the biological sample, in which J is an integer greater than or equal to 1, in which each raw fluorescence image sequence (Y) includes S fluorescence images, S is an integer greater than or equal to 2, and each fluorescence image has a pixel size of M*N, with M and N being even numbers;

in which the self-supervised multimodal structured illumination microscopic reconstruction system is further configured to, for each of the J raw fluorescence image sequences (Y):

1) extract, by means of pixel realigning, a first sub-image, a second sub-image, a third sub-image, and a fourth sub-image each with a pixel size of $(M/2)*(N/2)$ from an $i^{-th}$ fluorescence image ($y_i$) among the S fluorescence images, in which a two-dimensional (2D) pixel matrix $y_{i,(2m-1)(2n-1)}$ of the first sub-image, a 2D pixel matrix $y_{i,(2m-1)(2n)}$ of the second sub-image, a 2D pixel matrix $y_{i,(2m)(2n-1)}$ of the third sub-image, and a 2D pixel matrix $y_{i,(2m)(2n)}$ of the fourth sub-image are selected from a 2D pixel matrix $y_{i,MN}$ of the $i^{-th}$ fluorescence image ($y_i$) respectively, where m is an integer and m=1, 2, 3, . . . , M/2, and n is an integer and n=1, 2, 3, . . . , N/2;

2) perform 2× pixel upsampling on the first sub-image, the second sub-image, the third sub-image, and the fourth sub-image to obtain a first upsampled sub-image, a second upsampled sub-image, a third upsampled sub-image, and a fourth upsampled sub-image each with a pixel size of M*N;

3) perform a pixel translation of [0.5, 0.5] on a 2D pixel matrix of the first upsampled sub-image to obtain a first 2D subpixel translated sub-image; perform a pixel translation of [−0.5, 0.5] on a 2D pixel matrix of the second upsampled sub-image to obtain a second 2D subpixel translated sub-image; perform a pixel translation of [0.5, −0.5] on a 2D pixel matrix of the third upsampled sub-image to obtain a third 2D subpixel translated sub-image; and perform a pixel translation of [−0.5, −0.5] on a 2D pixel matrix of the fourth upsampled sub-image to obtain a fourth 2D subpixel translated sub-image;

4) group S first 2D subpixel translated sub-images obtained from the S fluorescence images into a first sub-image group, group S second 2D subpixel translated sub-images obtained from the S fluorescence images into a second sub-image group, group S third 2D subpixel translated sub-images obtained from the S fluorescence images into a third sub-image group, and group S fourth 2D subpixel translated sub-images obtained from the S fluorescence images into a fourth sub-image group;

5) perform SIM reconstruction on the first sub-image group, the second sub-image group, the third sub-image group, and the fourth sub-image group using a standard SIM algorithm, to obtain a first super-resolution sub-image, a second super-resolution sub-image, a third super-resolution sub-image, and a fourth super-resolution sub-image respectively; and 6) select two different super-resolution sub-images from the first super-resolution sub-image, the second super-resolution sub-image, the third super-resolution sub-image, and the fourth super-resolution sub-image to form a super-resolution image pair for training, and incorporate the super-resolution image pair for training into a training set; and in which the self-supervised multimodal structured illumination microscopic reconstruction system is further configured to:

7) train a denoising neural network based on the training set; and 8) perform super-resolution reconstruction on the S fluorescence images in each of the J raw fluorescence image sequences (Y) using a standard structured illumination super-resolution reconstruction algorithm, to form a super-resolution image, in which the super-resolution image is input into the denoising neural network to obtain a final super-resolution reconstructed image.

BRIEF DESCRIPTION OF THE DRAWINGS

The principles and various aspects of the present disclosure are more comprehensively understood from the detailed description below combined with the accompanying drawings. It should be noted that scales of the accompanying drawings may differ for a purpose of clear illustration, but this will not affect the understanding of the present disclosure.

DETAILED DESCRIPTION

Figure 1:
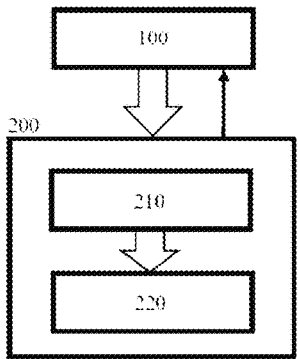
FIG. 1 is a schematic basic block diagram of a structured illumination microscopic imaging system.

In the accompanying drawings of the present disclosure, features with the same structure or similar functions are denoted by the same reference numerals.

When using the SIM technology for imaging and observation of live cells, the SNR of the obtained raw fluorescence images is usually low due to the following factors:

1) Limited by the types of fluorescent dyes and fluorescent proteins applicable for fluorescent labeling of live cells, the fluorescence labeling efficiency is usually low, resulting in a low emission efficiency of the fluorescent signals emitted by the sample upon excitation by light irradiation.

2) To avoid damaging live cells, only low-intensity excitation illumination sources can usually be used for irradiation, which also reduces a fluorescence intensity.

3) Since live cells usually move at high speeds, the exposure time for photographing needs to be shortened as much as possible to capture movement processes of live cells, which in turn leads to a corresponding decrease in the intensity of the acquired fluorescent signals.

For the above reasons, especially for the observation of live cells, how to denoise images has become a crucial breakthrough point in the structured illumination microscopic imaging technology. In existing research on image denoising in the structured illumination microscopic imaging technology, denoising algorithms such as Wiener filtering and BM3D are mainly used to achieve targeted suppression of noise based on the statistical differences between image noise and sample information. However, in the case where the raw fluorescence images obtained from observing live cells have an extremely low SNR, algorithms relying on such statistical differences cannot achieve effective denoising because the image noise is deeply coupled with the sample information.

In addition, in recent years, with the rapid development of deep learning technology, an image denoising method using a neural network has attracted increasing attention. However, if the raw fluorescence images of live cells are used to train denoising neural networks, a "supervised" training mechanism is usually required, which necessitates the prior collection of a large number of matched "high SNR-low SNR" image pairs to construct a training set. Nevertheless, collecting a large number of such "high SNR-low SNR" image pairs not only causes damage to live cells (as it requires increasing the irradiation intensity of the excitation illumination), but also significantly increases the experimental cost due to higher requirements for the selection of fluorescent dyes and fluorescent proteins. In addition, for the observation of live cells, a plurality of samplings for the same live sample are also required, which reduces a temporal resolution and makes the processing of video data infeasible.

To address the above issues, the present disclosure proposes a novel self-supervised multimodal technical solution for super-resolution reconstruction and denoising of structured illumination microscopic images. When training a neural network employed in this technical solution, a training set is generated solely from a set of fluorescent images acquired in a single capture by employing a novel "pixel realigning technology"—without the need for supervision using high SNR images nor a plurality of samplings of the same living biological sample, which enables a "self-supervised" training on the neural network. The pre-trained neural network can reliably reconstruct a denoised super-resolution image based on a raw fluorescent image with low SNR, thereby significantly improving a quality of a structured illumination microscopic image and expanding an application scope of the SIM technology.

FIG. 1 is a schematic basic block diagram of a structured illumination microscopic imaging system. The structured illumination microscopic imaging system generally includes an optical imaging system 100 and a control and data processing system 200. The optical imaging system 100 includes an excitation optical path and a detection optical path. The excitation optical path includes an excitation objective lens and other optical components for generating excitation illumination. An excitation illumination beam can be emitted through the excitation objective lens in a form of structured illumination with periodic fringes, to excite fluorescence on a biological sample. The detection optical path includes a detection objective lens and other optical components for imaging, and the detection optical path is used to receive and detect the excited fluorescence. It should be clear to those skilled in the art that, depending on configurations of the structured illumination microscopic imaging system, the excitation objective lens and the detection objective lens may be the same objective lens or different objective lenses. When performing three-dimensional (3D) fluorescence microscopic imaging on a biological sample, especially a living biological sample, multi-layer fluorescence images are acquired by continuously sampling and scanning along an optical axis direction (i.e., an axial direction) of the detection objective lens. Thus, each time the scanning and sampling is completed, the acquired multi-layer fluorescence images form a fluorescence image stack (also referred to as a "sequence").

The control and data processing system 200 mainly includes a computer and related components (e.g., a data memory, etc.). The control and data processing system 200 can control operations of the optical imaging system 100 and receive image data from the optical imaging system 100 for corresponding post-processing. For example, the acquired fluorescence image stack is provided to the control and data processing system 200, and a series of data processing is performed to reconstruct the fluorescence image stack into a high SNR 3D microscopic image. For this purpose, the control and data processing system 200 may include a self-supervised multimodal structured illumination microscopic image reconstruction module or system (also referred to as a "self-supervised multimodal structured illumination microscopic reconstruction module or system"). The self-supervised multimodal structured illumination microscopic image reconstruction module or system includes a super-resolution reconstruction sub-module 210 and a denoising sub-module 220. It should be noted that within the scope of the present disclosure, the modules and/or sub-modules described herein may be understood as including a data memory (e.g., a computer-readable storage medium) in which programs or subroutines, as well as a denoising neural network model, that can be called and run by a computer (in particular, the computer of the control and data processing system 200) are stored. When these programs or subroutines and the denoising neural network model are called and executed by the computer, methods/steps described below, in particular self-supervised multimodal structured illumination microscopic image reconstruction methods/steps, may be implemented. The specific programming methods for the programs and/or subroutines are not within the scope of discussion of the present disclosure, and those skilled in the art can implement the relevant functions using any well-known programming software and/or commercial software. Therefore, when the following of the present disclosure describes operations of relevant systems, operations of relevant modules, or relevant methods, it should be understood that they can also be written as programs to be called and executed by the computer.

The super-resolution reconstruction sub-module 210 can select a standard structured illumination super-resolution reconstruction algorithm to perform super-resolution reconstruction on the fluorescence images acquired by the optical imaging system 100. Within the scope of the present disclosure, the standard structured illumination super-resolution reconstruction algorithm may be considered as an algorithm already known in the field of microscopic imaging. As an example, the standard structured illumination super-resolution reconstruction algorithm may refer to the published literature by Gustafsson, M. G. et al.: *Three-dimensional resolution doubling in wide-field fluorescence microscopy by structured illumination. Biophys J 94, 4957-4970 (2008)*.

The denoising sub-module 220 can be implemented using any neural network architecture in a manner known to those skilled in the art for the image denoising processing. For example, the neural network model adopted in the denoising sub-module 220 includes but is not limited to a U-shaped neural network model, a residual neural network model, a residual channel attention convolutional neural network model, or a Fourier channel attention convolutional neural network model. When training the neural network of the denoising sub-module 220, a loss function is used to optimize relevant network models, and the loss function includes but is not limited to a mean square error (MSE), a mean absolute error (MAE), a structural similarity (SSIM), or a weighted sum of the MSE, the MAE and the SSIM.

Figure 2A:
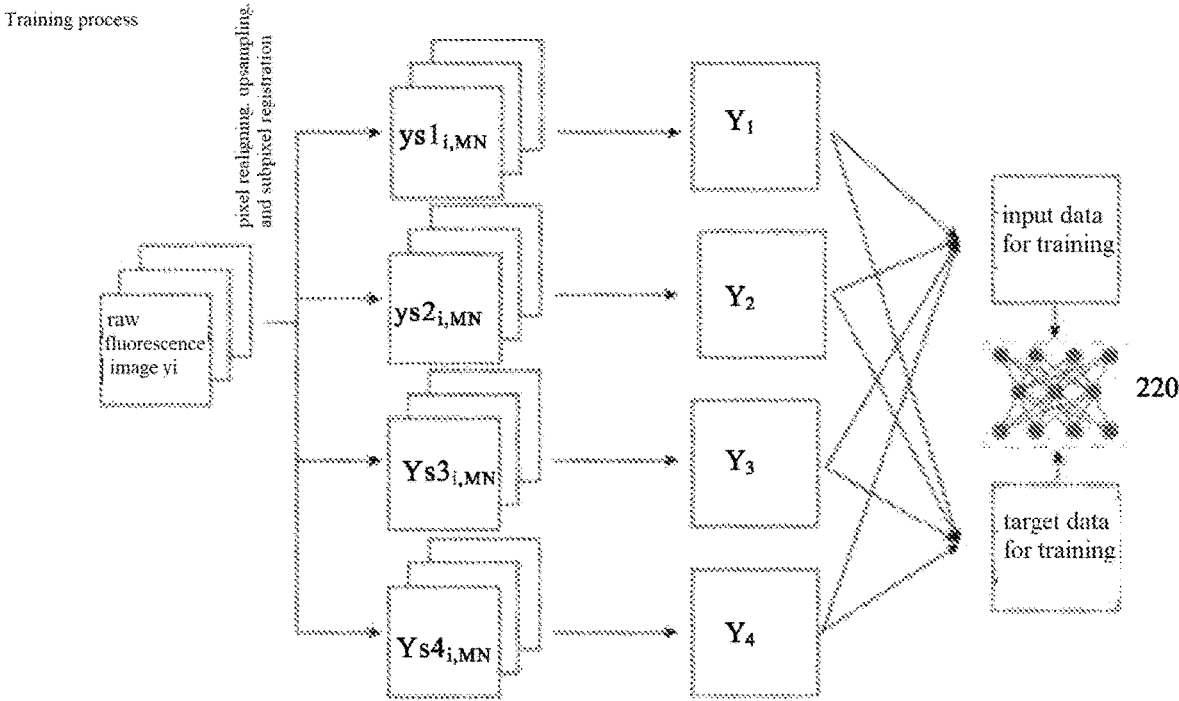
FIG. 2A is a schematic diagram of a process for training a neural network of a denoising module in a self-supervised multimodal structured illumination microscopic reconstruction system according to an embodiment of the present disclosure.
Figure 2B:
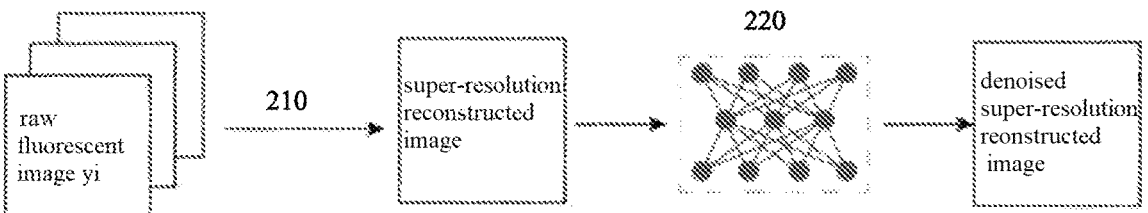
FIG. 2B is a schematic diagram of a process for reconstructing a raw fluorescence image sequence using a self-supervised multimodal structured illumination microscopic reconstruction system with a pre-trained neural network according to an embodiment of the present disclosure.

Therefore, the super-resolution reconstruction sub-module 210 (or referred to as a "super-resolution reconstruction module") and the denoising sub-module 220 (or referred to as a "denoising module") constitute the self-supervised multimodal structured illumination microscopic reconstruction system according to the present disclosure. FIG. 2A is a schematic diagram of a process for training a neural network of the denoising module 220 in the self-supervised multimodal structured illumination microscopic reconstruction system using a raw fluorescence image sequence Y obtained by the optical imaging system 100 according to an embodiment of the present disclosure. FIG. 2B is a schematic diagram of a process for reconstructing the raw fluorescence image sequence Y obtained by the optical imaging system 100 using the self-supervised multimodal structured illumination microscopic reconstruction system with a pre-trained neural network according to an embodiment of the present disclosure.

The optical imaging system 100 to which the self-supervised multimodal structured illumination microscopic reconstruction system of the present disclosure is applicable may include but is not limited to a 2D-SIM system, a 3D-SIM system, a lattice light-sheet SIM (LLS-SIM) system, or a grazing incidence illumination SIM (GI-SIM) system. Therefore, the term "multimodal structured illumination microscopic reconstruction" refers to that such "structured illumination microscopic reconstruction" can be applied to a plurality of optical imaging systems. In addition, to overcome the various shortcomings mentioned in the background section, the multimodal structured illumination microscopic reconstruction system of the present disclosure adopts a unique self-supervised method for neural network training. A basic principle of training the neural network of the denoising module 220 in the self-supervised multimodal structured illumination microscopic reconstruction system of the present disclosure is introduced below with reference to FIG. 2A.

First, taking the 2D-SIM system as an example of the optical imaging system 100, fluorescence image scanning is performed on a biological sample to obtain a raw image sequence Y. For example, the raw image sequence Y acquired by the optical imaging system 100 can be represented as a series of fluorescence images $y_i$ (i=1, 2, . . . , S) with noises under different illumination modes, where S denotes the number of illumination modes of the optical imaging system 100, and S is an integer greater than or equal to 2.

It should be clear to those skilled in the art that each fluorescence image can be represented as a 2D pixel matrix readable and processable by the computer of the control and data processing system 200. For example, the fluorescence image $y_i$ can be represented as $y_{i, MN}$, where M is the number of row pixels of the fluorescence image, and N is the number of column pixels of the fluorescence image. For the fluorescence images involved in the present disclosure, M and N may be the same or different, and both M and N are even numbers. For example, the fluorescence image $y_i$ can be $y_{i, 512*512}$, indicating that a size of an $i^{-th}$ image $y_i$ is 512*512 pixels.

Of course, for a raw fluorescence image where M or N is an odd number, in order to apply the technical solution of the present disclosure, those skilled in the art should understand that one row or one column of pixels (for example, at the boundary) of the fluorescence image can be removed accordingly to ensure that the maximum number of pixels in a row direction and the maximum number of pixels in a column direction of the raw fluorescence image used in the technical solution of the present disclosure are both even numbers.

Figure 3:
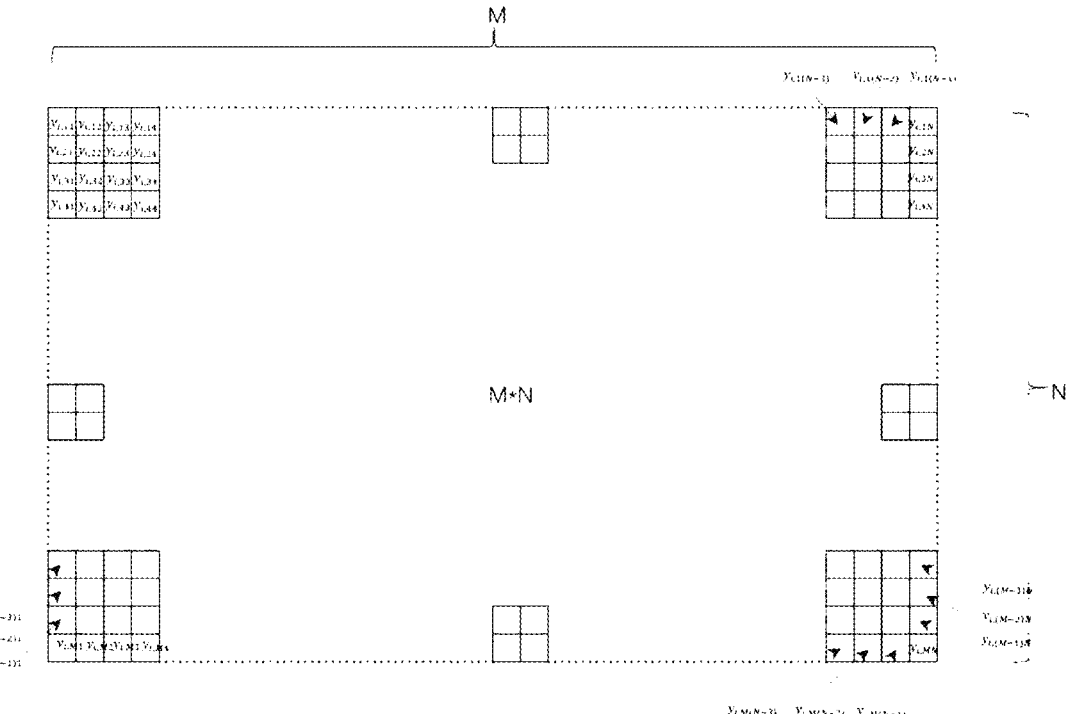
FIG. 3 is a schematic diagram of a 2D pixel matrix representing a fluorescence image.
Figure 4A:
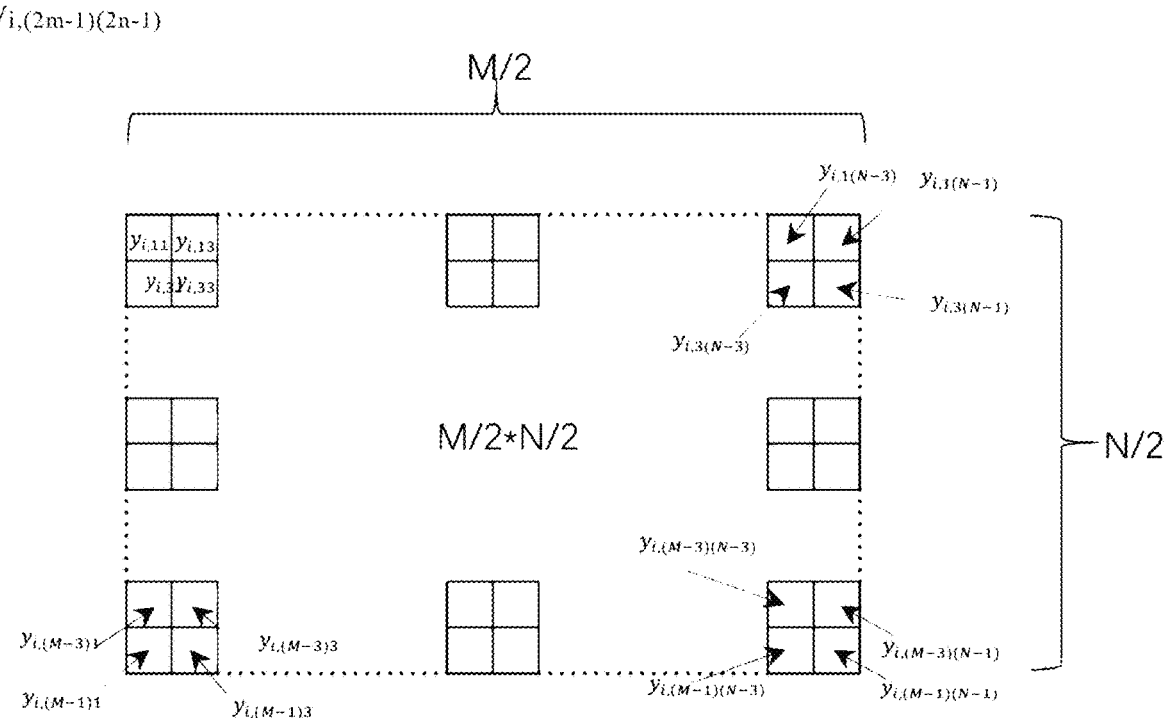
FIGS. 4A, 4B, 4C, and 4D are schematic diagrams of 2D pixel matrices of sub-images extracted from the 2D pixel matrix of FIG. 3 by "pixel realigning".
Figure 4B:
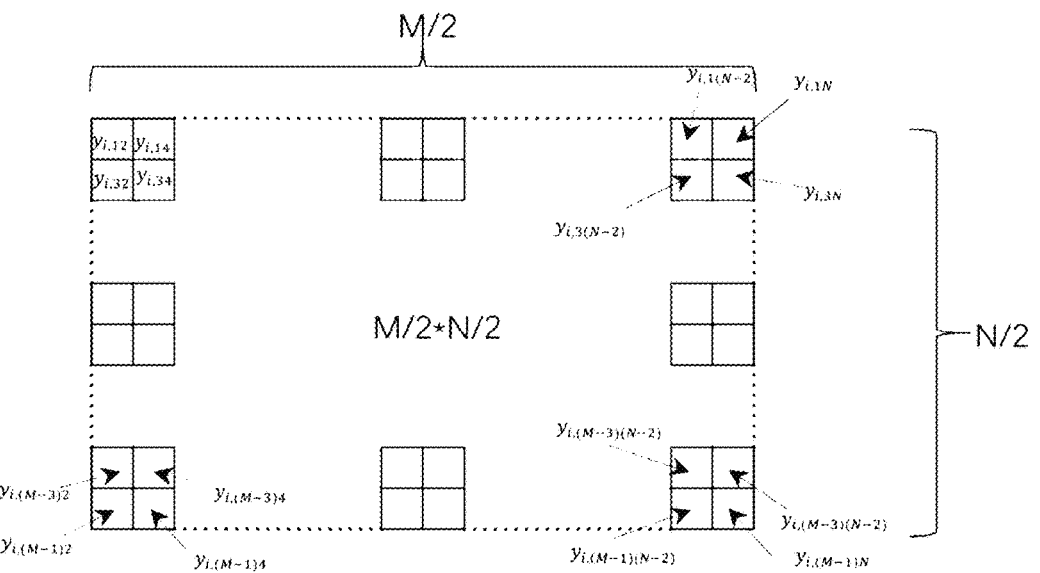
Figure 4C:
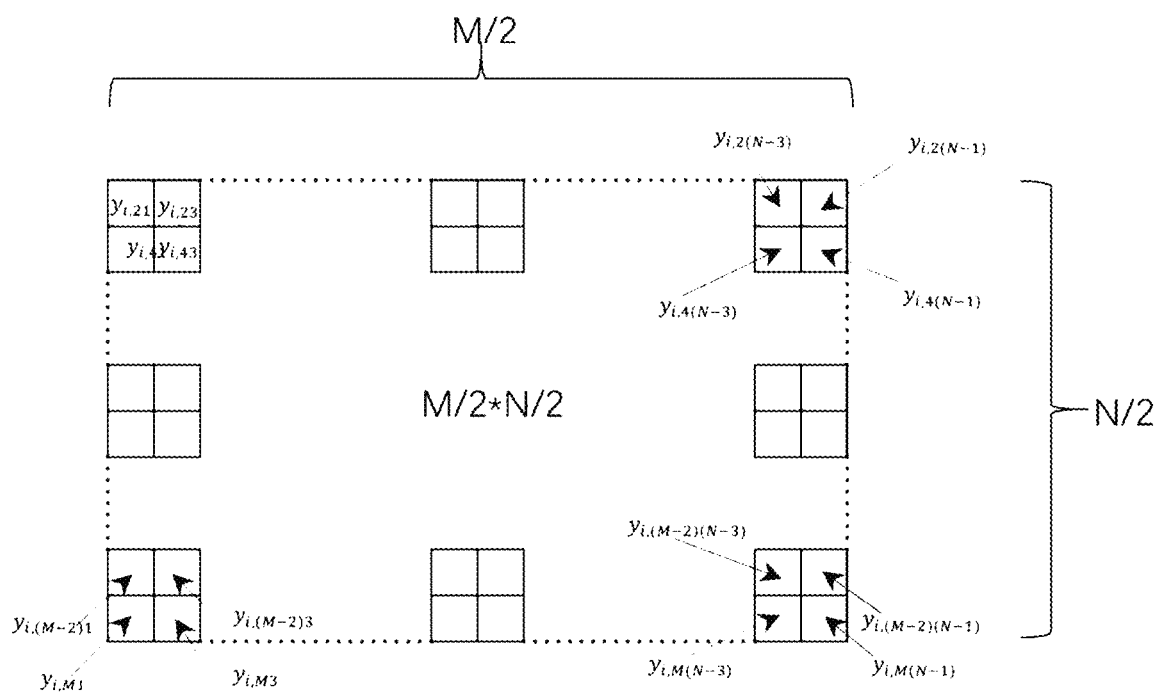
Figure 4D:
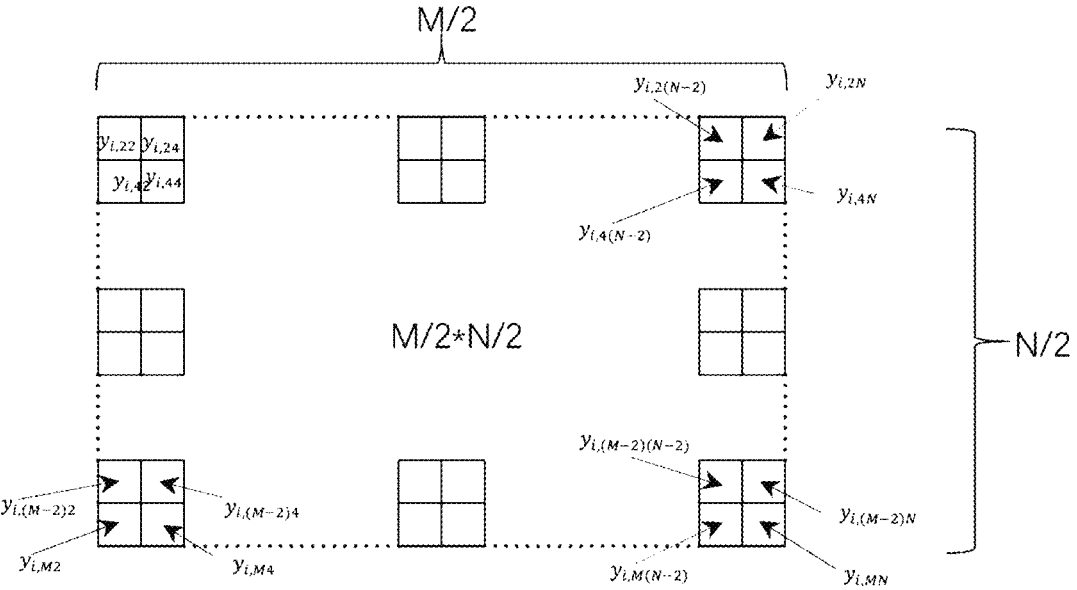

FIG. 3 is a schematic diagram of a 2D pixel matrix $y_{i, MN}$ representing an $i^{-th}$ fluorescence image $y_i$ in the raw image sequence Y. According to an embodiment of the present disclosure, a training set for training the neural network of the denoising module 220 is obtained using the 2D pixel matrices of all fluorescence images in the raw image sequence Y by means of "pixel realigning". The following takes FIG. 3 as an example to illustrate adopting the "pixel realigning" on the $i^{-th}$ fluorescence image $y_i$, and those skilled in the art should understand that the same method can be applied to other fluorescence images in the raw image sequence Y.

(1) Four sub-images $y_{i,(2m-1)(2n-1)}$, $y_{i,(2m-1)(2n)}$, $y_{i,(2m)(2n-1)}$, and $y_{i,(2m)(2n)}$ are extracted and generated from the 2D pixel matrix $y_{i, MN}$ of the fluorescence image $y_i$ by means of 2× pixel downsampling, where m is an integer and m=1, 2, 3, . . . , M/2, and n is an integer and n=1, 2, 3, . . . , N/2. Therefore, if a pixel size of the 2D pixel matrix $y_{i, MN}$ is M*N, then the pixel sizes of the four sub-images $y_{i,(2m-1)(2n-1)}$, $y_{i,(2m-1)(2n)}$, $y_{i,(2m)(2n-1)}$, and $y_{i,(2m)(2n)}$ are all (M/2)*(N/2), as shown in FIGS. 4A to 4D. In the context of the present disclosure, when referring to the fluorescence image, the 2D pixel matrix of the fluorescence image, the sub-image, or the 2D pixel matrix of the sub-images, pixel points of an image are counted starting from 1 for the leftmost pixel point in the row direction, and starting from 1 for the topmost pixel point in the column direction.

Figure 5:
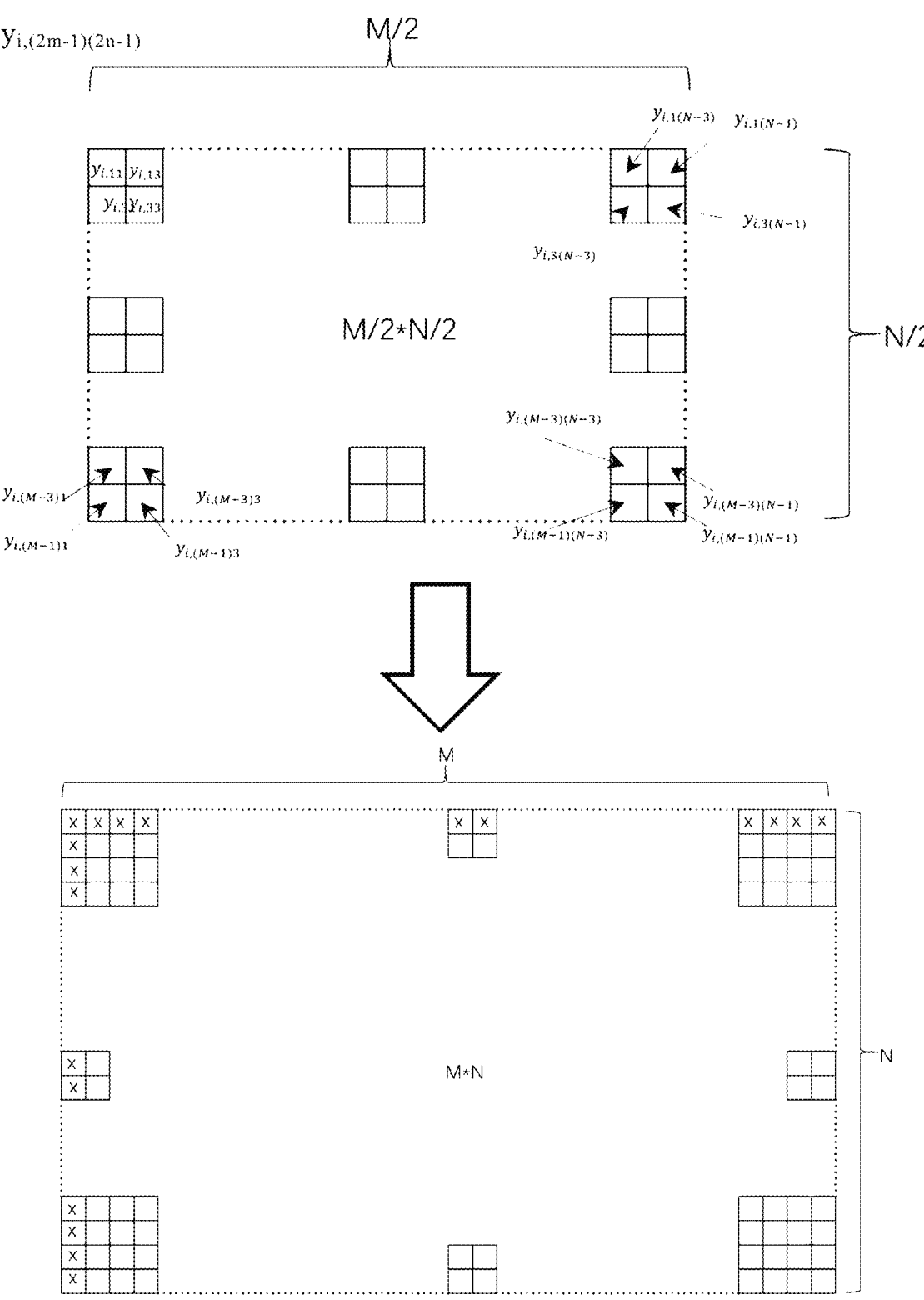
FIG. 5 is a schematic diagram of processing of the 2D pixel matrix of the sub-image in FIG. 4A by "2× pixel upsampling".

(2) 2× pixel upsampling is performed on the four sub-images $y_{i,(2m-1)(2n-1)}$, $y_{i,(2m-1)(2n)}$, $y_{i,(2m)(2n-1)}$, and $y_{i,(2m)(2n)}$ to obtain four upsampled sub-images $ys1'_{i,MN}$, $ys2'_{i,MN}$, ys3$'_{i,MN}$, and ys4$'_{i,MN}$ with a pixel size of M*N. Only the upsampled sub-image ys1$'_{i,MN}$ of one sub-image $y_{i,(2m-1)(2n-1)}$ is schematically shown in FIG. 5. Those skilled in the art should understand that methods that can be used for the 2× pixel upsampling of images include but are not limited to nearest-neighbor interpolation, bilinear interpolation, biquadratic spline interpolation, and any other known methods for processing images in computers. Therefore, no redundant description is provided herein.

(3) Since the pixel sizes of the four upsampled sub-images ys1$'_{i,MN}$, ys2$'_{i,MN}$, ys3$'_{i,MN}$, and ys4$'_{i,MN}$ are all the same as the pixel size of the raw 2D pixel matrix $y_{i,MN}$, considering differences in previous downsampling methods, an image center of each sub-image (i.e., ys1$'_{i,MN}$, ys2$'_{i,MN}$, ys3$'_{i,MN}$, and ys4$'_{i,MN}$) has a different deviation from an image center of the raw 2D pixel matrix $y_{i,MN}$. Therefore, to eliminate an impact caused by the deviation between the image center of the sub-image and the image center of the raw image, subpixel registration is performed on each of the sub-images ys1$'_{i,MN}$, ys2$'_{i,MN}$, ys3$'_{i,MN}$, and ys4$'_{i,MN}$ respectively. That is, a 2D subpixel translation of [0.5, 0.5] is performed on the sub-image ys1$'_{i,MN}$ to obtain a sub-image ys1$_{i,MN}$, a 2D subpixel translation of [−0.5, 0.5] is performed on the sub-image ys2$'_{i,MN}$ to obtain a sub-image ys2$_{i,MN}$, a 2D subpixel translation of [0.5, −0.5] is performed on the sub-image ys3$'_{i,MN}$, to obtain a sub-image ys3$_{i,MN}$, and a 2D subpixel translation of [−0.5, −0.5] is performed on the sub-image ys4$'_{i,MN}$ to obtain a sub-image ys4$_{i,MN}$.

Within the scope of the present disclosure, in the process of translating images (subpixel registration), translation to the right in the row direction is defined as positive, and translation to the left in the row direction is defined as negative; translation downward in the column direction is defined as positive, and translation upward in the column direction is defined as negative. For example, [0.5, 0.5] should be understood as translating the sub-image to be processed by 0.5 pixels to the right in the row direction and by 0.5 pixels downward in the column direction. [−0.5, −0.5] should be understood as translating the sub-image to be processed by 0.5 pixels to the left in the row direction and by 0.5 pixels upward in the column direction. The translation image processing involved in the technical solution of the present disclosure can be implemented using any known software, program, or command in computer image processing technology, and no redundant description is provided herein.

Those skilled in the art should understand that during the 2D subpixel translation process of the sub-images, there will be invalid pixel values (for example, zeroed pixel values generated by translation) in the corresponding boundary rows and columns of the sub-images. As shown in FIG. 5, taking the sub-image ys1$'_{i,MN}$ as an example, after performing the 2D subpixel translation of [0.5, 0.5], null values (zeroed pixel values) may appear in the pixels of the leftmost column and topmost row of the translated sub-image ys1$_{i,MN}$, as marked by "x" in the figure. However, the null values present at the boundaries do not affect the subsequent results of processing and recognition for overall images, so the impact of such null values can be ignored in the technical solution of the present disclosure.

(4) The steps described in (1) to (3) above are repeated for each fluorescence image in the raw image sequence Y, and then sub-image groups ys1$_{i,MN}$, ys2$_{i,MN}$, ys3$_{i,MN}$, and ys4$_{i,MN}$ can be obtained, where i=1, 2, . . . , S. Subsequently, SIM reconstruction is performed on each of the sub-image groups ys1$_{i,MN}$, ys2$_{i,MN}$, ys3$_{i,MN}$, and ys4$_{i,MN}$ by using a standard SIM reconstruction algorithm to obtain four super-resolution sub-images $Y_1$, $Y_2$, $Y_3$, and $Y_4$. As mentioned earlier, the standard structured illumination super-resolution reconstruction algorithm may refer to the published literature by Gustafsson, M. G. et al.: *Three-dimensional resolution doubling in wide-field fluorescence microscopy by structured illumination. Biophys J 94, 4957-4970 (2008)* or any other known reconstruction algorithm.

(5) For the raw image sequence Y, in a case of obtaining the four super-resolution sub-images $Y_1$, $Y_2$, $Y_3$, and $Y_4$, two different super-resolution sub-images are selected to form a super-resolution image pair for training. For example, for one raw image sequence, there are 12 combinations of super-resolution image pairs for training, namely $(Y_1, Y_2)$, $(Y_1, Y_3)$, $(Y_1, Y_4)$, $(Y_2, Y_3)$, $(Y_2, Y_4)$, $(Y_3, Y_4)$, $(Y_2, Y_1)$, $(Y_3, Y_1)$, $(Y_4, Y_1)$, $(Y_3, Y_2)$, $(Y_4, Y_2)$, $(Y_4, Y_3)$. In each super-resolution image pair for training composed of two super-resolution images, the first super-resolution image serves as input data for training, and the second super-resolution image serves as target data for training. In other words, on the premise of ignoring the order of the two super-resolution images in the super-resolution image pair for training, it can also be considered that one super-resolution image in the super-resolution image pair for training serves as the input data for training, and another super-resolution image in the super-resolution image pair serves as the target data for training.

For the observation of live cells, if J raw fluorescence image sequences are obtained by the optical imaging system 100 (where J can be an integer greater than or equal to 1), then for each raw fluorescence image sequence among the J raw fluorescence image sequences (for example, each raw fluorescence image sequence can be composed of S fluorescence images), 12 combinations of super-resolution image pairs for training can be obtained using the above method. Finally, for all J raw fluorescence image sequences, J*12 super-resolution image pairs for training are obtained. These super-resolution image pairs for training constitute the training set for training the neural network of the denoising module 220. The neural network of the denoising module 220 can be trained using any selected super-resolution image pair for training from this training set. For example, in each training cycle, one super-resolution image pair for training is randomly selected from the training set, and image patches at the same position are randomly extracted from the two super-resolution sub-images. After performing random rotation and flipping, the extracted image patches serve as an input image and a target image of the neural network respectively. An error between a network output and the target image is calculated, and a gradient of the error is back-propagated to update a network parameter of the denoising neural network. After the network's input error converges, the training is stopped and the network parameters are stored. Those skilled in the art should understand that the training method for the neural network is not limited to those listed. It can be seen that the neural network training of the present disclosure is actually a form of self-supervised training.

Those skilled in the art should understand that when only J=1, it can be considered that the optical imaging system 100 is performing static observation on the biological sample. In this case, the optical imaging system 100 acquires a static fluorescence imaging sequence for the biological sample, in which the static fluorescence imaging sequence is composed of a plurality of raw fluorescence images. When J≥2, it can be considered that the optical imaging system 100 is performing dynamic observation on the biological sample (for example, continuous video shooting). In this case, a plurality of fluorescence imaging sequences are obtained, and each fluorescence imaging sequence includes a plurality of raw fluorescence images.

After the neural network of the denoising module 220 is trained, the self-supervised multimodal structured illumination microscopic imaging system performs reconstruction (or prediction) on the raw fluorescence image sequence obtained by the optical imaging system 100, as shown in FIG. 2B. Super-resolution reconstruction is performed on the fluorescence images with noises in each raw fluorescence image sequence using the super-resolution reconstruction sub-module 210 to obtain a super-resolution image. Then, the obtained super-resolution image serves as an input of the neural network of the denoising module 220, thereby obtaining a final denoised super-resolution image.

Figure 6:
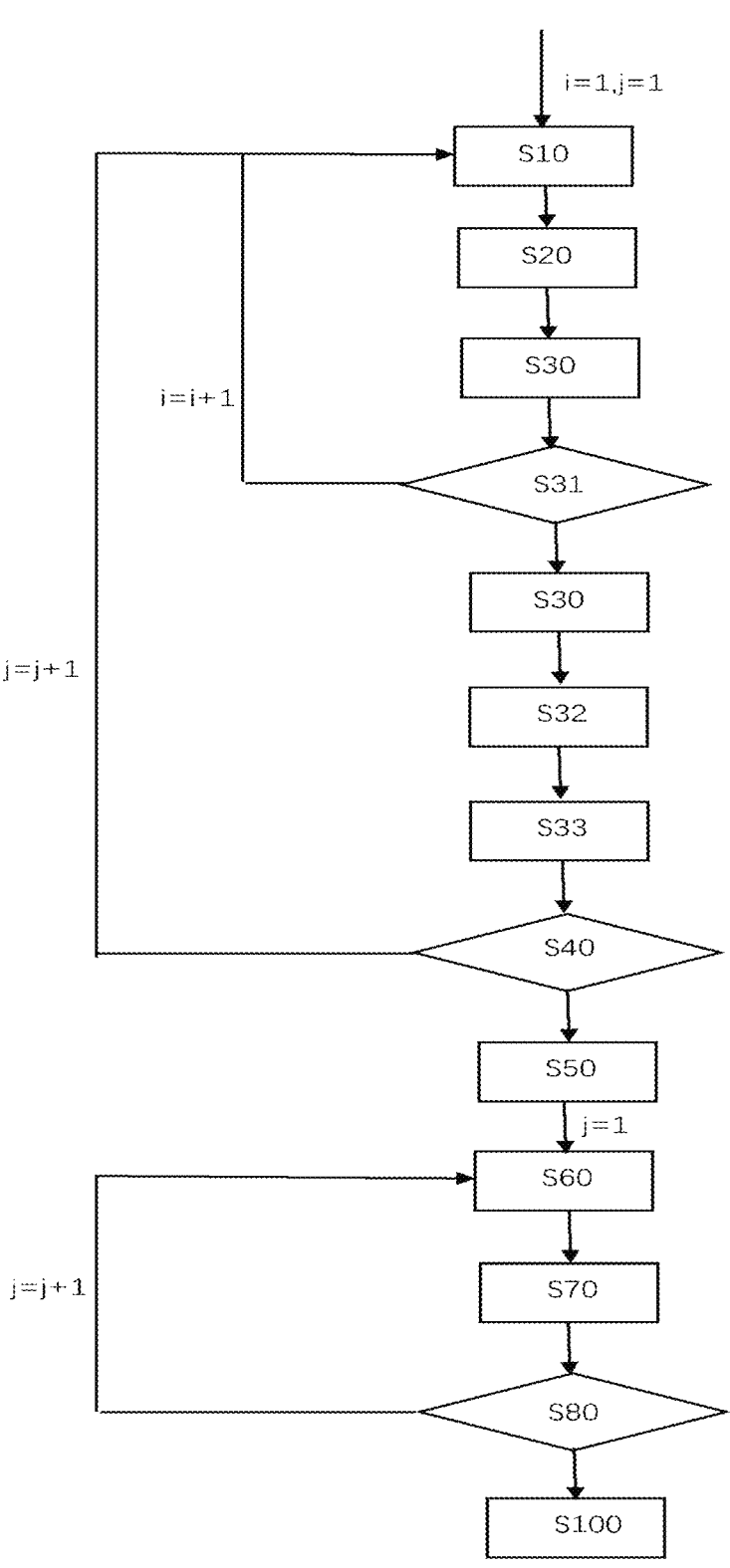
FIG. 6 is a schematic flowchart of a self-supervised multimodal structured illumination microscopic reconstruction method according to an embodiment of the present disclosure.

FIG. 6 is a schematic flowchart of a self-supervised multimodal structured illumination microscopic reconstruction method according to an embodiment of the present disclosure. It is assumed that J raw fluorescence image sequences Y are acquired for a biological sample or living cells using the optical imaging system 100, where J is an integer greater than or equal to 1. A $j^{-th}$ raw fluorescence image sequence $Y_j$ (j=1, 2, . . . , J) includes fluorescence images $y_i$ (i=1, 2, . . . , S), where S is an integer greater than or equal to 2, and each fluorescence image $y_i$ has a pixel size of M*N, with M and N being integers at least greater than 2 and even numbers.

In step S10, for the fluorescence image $y_i$ (e.g., starting from i=1) in the $j^{-th}$ raw fluorescence image sequence $Y_j$ (e.g., starting from j=1), four sub-images $y_{i,(2m-1)(2n-1)}$, $y_{i,(2m-1)(2n)}$, $y_{i,(2m)(2n-1)}$, and $y_{i,(2m)(2n)}$ are extracted and generated from the 2D pixel matrix $y_{i,MN}$ of the fluorescence image $y_i$ by means of 2× pixel downsampling using a computer, where m is an integer and m=1, 2, 3, . . . , M/2, and n is an integer and n=1, 2, 3, . . . , N/2.

In step S20, 2× pixel upsampling is performed on the four sub-images $y_{i,(2m-1)(2n-1)}$, $y_{i,(2m-1)(2n)}$, $y_{i,(2m)(2n-1)}$, and $y_{i,(2m)(2n)}$ using the computer to obtain four upsampled sub-images $ys1'_{i,MN}$, $ys2'_{i,MN}$, $ys3'_{i,MN}$, and $ys4'_{i,MN}$ with a pixel size of M*N. Methods that can be used for the 2× pixel upsampling of images include but are not limited to nearest-neighbor interpolation, bilinear interpolation, biquadratic spline interpolation, and any other known methods for processing images in computers.

In step S30, subpixel registration is performed, by the computer, on each of the sub-images $ys1'_{i,MN}$, $ys2'_{i,MN}$, $ys3'_{i,MN}$, and $ys4'_{i,MN}$ respectively. That is, a 2D subpixel translation of [0.5, 0.5] is performed on the sub-image $ys1'_{i,MN}$ to obtain a sub-image $ys1_{i,MN}$, a 2D subpixel translation of [−0.5, 0.5] is performed on the sub-image $ys2'_{i,MN}$ to obtain a sub-image $ys2_{i,MN}$, a 2D subpixel translation of [0.5, −0.5] is performed on the sub-image $ys3'_{i,MN}$, to obtain a sub-image $ys3_{i,MN}$, and a 2D subpixel translation of [−0.5, −0.5] is performed on the sub-image $ys4'_{i,MN}$ to obtain a sub-image $ys4_{i,MN}$.

In step S31, it is determined, by the computer, that steps S10 to S30 have been repeated for each fluorescence image in the raw image sequence $Y_j$. For example, if i is not equal to S, set i=i+1 and repeat steps S10 to S30; if i=S, proceed to step S32.

In step S32, since steps S10 to S30 have been repeated for each fluorescence image in the raw image sequence $Y_j$, four sub-image groups $ys1_{i,MN}$, $ys2_{i,MN}$, $ys3_{i,MN}$, and $ys4_{i,MN}$ can be obtained, where i=1, 2, . . . , S. Super-resolution reconstruction is performed on each of the sub-image groups $ys1_{i,MN}$, $ys2_{i,MN}$, $ys3_{i,MN}$, and $ys4_{i,MN}$ using the super-resolution reconstruction module 210 to obtain four super-resolution sub-images $Y_1$, $Y_2$, $Y_3$, and $Y_4$.

In step S33, two different super-resolution sub-images are randomly selected from the four super-resolution sub-images $Y_1$, $Y_2$, $Y_3$, and $Y_4$ obtained in step S32 to form a super-resolution image pair for training. In this super-resolution image pair for training, the first super-resolution image serves as input data for training, and the second super-resolution image serves as target data for training. For example, for a single raw fluorescence image sequence, since four super-resolution sub-images are available, 12 combinations of super-resolution image pairs for training can be generated. These super-resolution image pairs for training can serve as part of the subsequent training set for training the neural network.

In step S40, it is determined whether steps S10 to S33 have been performed on all raw fluorescence image sequences. For instance, it can be determined whether j has reached the maximum value J. If j has not reached the maximum value J, set j=j+1 and repeat steps S10 to S32. If j has reached the maximum value J, proceed to step S50.

In step S50, the neural network of the denoising module 220 is trained using the training set obtained above. Those skilled in the art should understand that the training can be conducted in any appropriate manner. For example, in each training cycle, any number of super-resolution image pairs for training are randomly selected from the training set. Then, image patches at the same position in the first and second super-resolution images of each super-resolution image pair for training are randomly extracted, and the extracted image patches are subjected to random rotation and flipping, and act as an input image and a target image of the neural network respectively. An error between a network output and the target image is calculated, and a gradient of the error is back-propagated to update a network parameter of the denoising neural network. After the network's input error converges, the training is stopped and the network parameters are stored.

In step S60, starting from j=1, super-resolution reconstruction is performed on the fluorescence images $y_i$ (i=1, 2, 3, . . . , S) in the $j^{-th}$ raw fluorescence image sequence $Y_j$ using the super-resolution reconstruction module 210 to obtain a super-resolution image.

In step S70, the super-resolution image obtained in step S60 is input into the neural network of the denoising module 220, and an output image obtained is a final denoised super-resolution image.

In step S80, it is determined whether steps S60 to S70 have been performed on all raw fluorescence image sequences. For instance, it can be determined whether j has reached the maximum value J. If j has not reached the maximum value J, set j=j+1 and repeat steps S60 and S70. If j has reached the maximum value J, proceed to step S100. In step S100, exit the self-supervised multimodal structured illumination microscopic reconstruction method.

According to the present disclosure, as an example, a typical neural network (U-net) may serve as the neural network of the denoising module 220, with reference values for main parameters of the U-net shown in Table 1. It should be noted that the present disclosure does not restrict the use of a specific neural network structure. Typical network structures such as a residual network (ResNet), a residual channel attention network (RCAN), a residual dense network (RDN), and a self-attention network (or referred to as a transformer) can all achieve the described functions.

TABLE 1

| Main Parameters of the Neural Network | |
|---|---|
| Name | Main parameters |
| Encoding module | 4 compression encoding layers are contained. An input of each encoding layer is an output from the previous encoding layer. An image size is compressed by a factor of 2. The number of expanded channels included in each encoding layer among the 4 compression encoding layers is 48, 48, 48, and 96 respectively. |
| Decoding module | 4 decompression encoding layers are contained. An input of each decoding layer is a concatenation of an output from the previous decoding layer and the input layer. The image size is expanded by a factor of 2. |
| Convolutional layer | Kernel size is 3 × 3 |
| Activation layer | LeakyRelu function, with a slope of 0.1 |
| Downsampling layer | Step size is 2 × 2 |
| Upsampling Layer | Step size is 2 × 2, and nearest-neighbor interpolation is used |

In addition, the main parameters used in the training process of the neural network in the present disclosure need to be adjusted according to specific conditions of a dataset (such as SNR, structural complexity, etc.). A set of reference parameters is shown in Table 2.

TABLE 2

| Reference Parameters for Network Training Process | |
|---|---|
| Batch size | 4 |
| Patch size | 128 × 128 |
| Initial learning rate | 1 e$^{-4}$ |
| Learning rate update strategy | 0.5 Decay by 0.5 every 10,000 training cycles. |
| Loss function | $L2-$norm loss $\| \cdot \|_2^2$ |

Figure 7A:
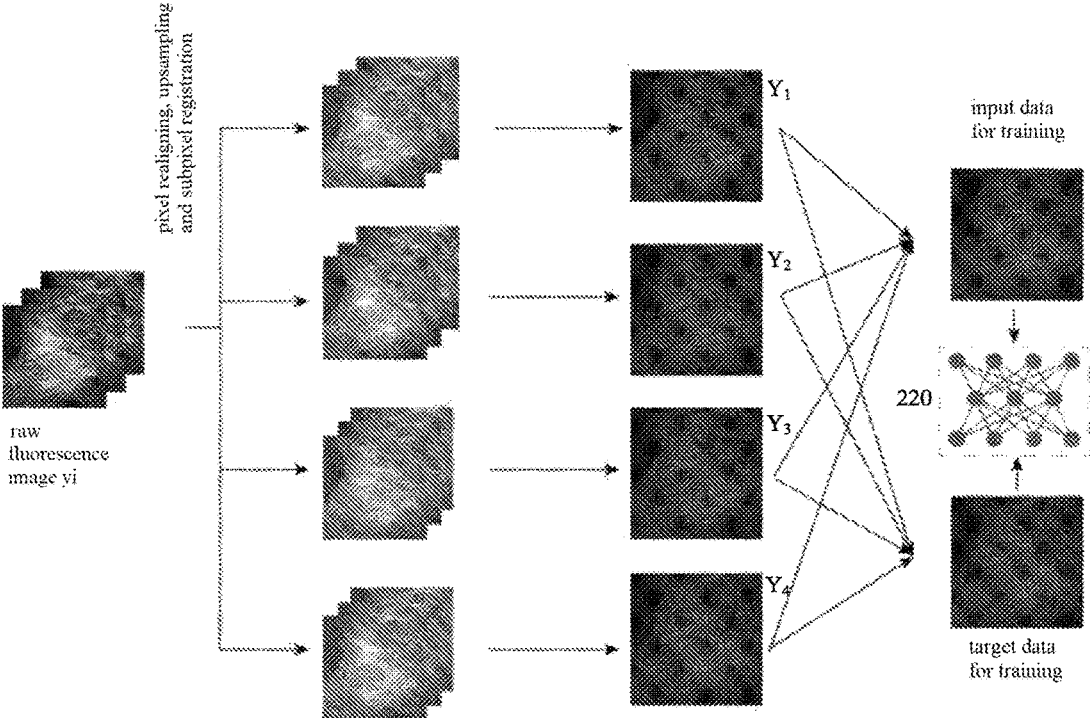
FIGS. 7A and 7B are schematic diagrams of microscopic image processing for a training process and a reconstruction process involved in the present disclosure, respectively.
Figure 7B:
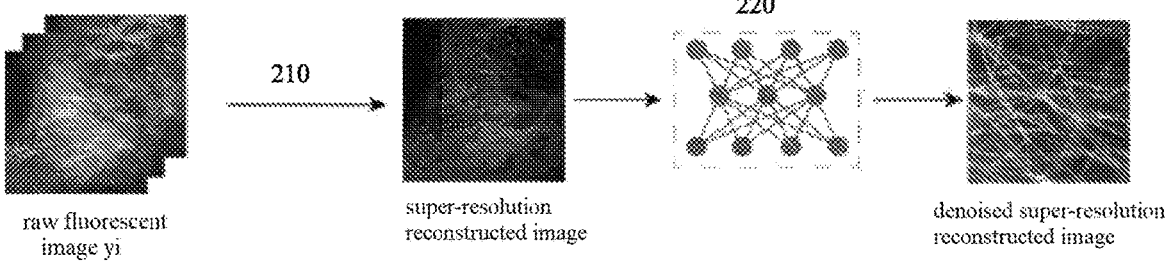

FIGS. 7A and 7B schematically illustrate a training process and a reconstruction process using the above-described method with the raw fluorescence image sequences, where FIG. 7A shows a process of training a neural network, and FIG. 7B shows a process of reconstructing the raw fluorescence image sequence using a reconstruction system with a pre-trained neural network.

The present disclosure adopts a unique "pixel realigning" method combined with the super-resolution reconstruction to obtain the training set for training the neural network of the denoising module, with the following main advantages.

When training the denoising neural network using the technical solution of the present disclosure, it is possible to obtain a sufficient training set for training the denoising neural network under the premise of raw fluorescence image sequences with extremely low SNRs. There is no need to sample the same biological sample multiple times, nor to irradiate the same biological sample with high-intensity excitation illumination to obtain raw fluorescence images with high SNRs, thereby reducing the possibility of damage to the biological sample.

The present disclosure adopts the unique "pixel realigning" technology to split the raw fluorescence image into four sub-images, and further obtains the super-resolution image pair for training via the upsampling, the subpixel registration, and the super-resolution reconstruction, thereby realizing a fully self-supervised neural network training mechanism.

The technical solution of the present disclosure can be directly applied to a long-term video data processing, so that video data can be directly used to construct the training set for training the neural network of the denoising module, and then the trained denoising module may be used to denoise the super-resolution microscopic images.

The present disclosure proposes the self-supervised structured illumination microscopic reconstruction method and system based on the pixel realigning, which can effectively denoise structured illumination microscopic data on raw images with extremely low SNRs and reconstruct high-fidelity super-resolution noise-free images. The method in the present disclosure significantly reduces the requirement for the SNR of the raw image during a structured illumination microscopic imaging process, thereby reducing illumination damage to the biological sample during the imaging process and improving imaging speed, significantly improving the quality of the structured illumination microscopic image and expanding the application range of the SIM technology.

In some embodiments, in a case where the denoising neural network is trained, one super-resolution sub-image in the super-resolution image pair for training serves as input data for training, and another super-resolution sub-image in the super-resolution image pair for training serves as target data for training.

In some embodiments, the self-supervised multimodal structured illumination microscopic reconstruction method further includes: in a case where the maximum number of pixels in a row direction and/or the maximum number of pixels in a column direction of the fluorescence image in the raw fluorescence image sequence is an odd number, removing a corresponding number of row pixels and/or column pixels to ensure that the maximum number of pixels in the row direction and the maximum number of pixels in the column direction of the fluorescence image are both even numbers.

In some embodiments, training the denoising neural network based on the training set includes: selecting one super-resolution image pair for training randomly from the training set during each training cycle; extracting image patches at the same position randomly from the two super-resolution sub-images; performing random rotation and flipping on the image patches to obtain an input image and a target image of the denoising neural network respectively; and calculating an error between a network output and the target image, and back-propagating a gradient of the error to update a network parameter.

In some embodiments, the denoising neural network includes at least one of a U-shaped neural network model, a residual neural network model, a residual channel attention convolutional neural network model, or a Fourier channel attention convolutional neural network model.

In some embodiments, an optical imaging system (100) is configured to excite the biological sample with structured illumination to obtain the J raw fluorescence image sequences (Y) generated by the exciting of the biological sample, in which the optical imaging system (100) includes a 2D-SIM system, a 3D-SIM system, an LLS-SIM system, or a GI-SIM system.

In some embodiments, the 2× pixel upsampling is implemented using nearest-neighbor interpolation, bilinear interpolation, or biquadratic spline interpolation.

In some embodiments, in a case where the denoising neural network is trained, one super-resolution sub-image in the super-resolution image pair for training serves as input data for training, and another super-resolution sub-image in the super-resolution image pair for training serves as target data for training.

In some embodiments, the self-supervised multimodal structured illumination microscopic reconstruction system is further configured to: in a case where the maximum number of pixels in a row direction and/or the maximum number of pixels in a column direction of the fluorescence image in the raw fluorescence image sequence is an odd number, remove a corresponding number of row pixels and/or column pixels to ensure that the maximum number of pixels in the row direction and the maximum number of pixels in the column direction of the fluorescence image are both even numbers.

In some embodiments, the self-supervised multimodal structured illumination microscopic reconstruction system is further configured to: select one super-resolution image pair for training randomly from the training set during each training cycle; extract image patches at the same position randomly from the two super-resolution sub-image; perform random rotation and flipping on the image patches to obtain an input image and a target image of the denoising neural network respectively; and calculate an error between a network output and the target image, and back-propagate a gradient of the error to update a network parameter.

In some embodiments, the denoising neural network includes at least one of a U-shaped neural network model, a residual neural network model, a residual channel attention convolutional neural network model, or a Fourier channel attention convolutional neural network model.

In some embodiments, the self-supervised multimodal structured illumination microscopic reconstruction system is further configured to use an optical imaging system (100) to excite the biological sample with structured illumination to obtain the J raw fluorescence image sequences (Y) generated by the exciting of the biological sample, in which the optical imaging system (100) includes a 2D-SIM system, a 3D-SIM system, an LLS-SIM system, or a GI-SIM system.

In some embodiments, the 2× pixel upsampling is implemented using nearest-neighbor interpolation, bilinear interpolation, or biquadratic spline interpolation.

By adopting the technical solutions of the present disclosure, especially for long-term video data of living cells, the training set can be constructed from raw data to train the neural network, and the raw data can be denoised. Thus, no additional data or trained models are required, which effectively reduces experimental costs and improves generalization of the technology.

In addition, by adopting the technical solutions of the present disclosure, extremely low excitation illumination power and extremely short exposure time can be used in the process of fluorescence imaging of cells, especially living cells. This significantly reduces phototoxicity, enables capture of a high-speed dynamic process, and improves an applicability to living cell imaging. In summary, the present disclosure is of great significance for improving a quality of the structured illumination microscopic image and expanding applications of the SIM technology.

Although specific embodiments of the present disclosure are described in detail herein, those embodiments are provided merely for explanatory purposes and should not be considered as limiting the scope of the present disclosure. In addition, those skilled in the art should understand that the various embodiments described in this specification can be used in combination with each other. Various substitutions, modifications, and transformations can be conceived without departing from the spirit and scope of the present disclosure.

The invention claimed is:

1. A self-supervised multimodal structured illumination microscopic reconstruction method, comprising:

exciting a biological sample with structured illumination to obtain J raw fluorescence image sequences generated by the exciting of the biological sample, wherein J is an integer greater than or equal to 1, wherein each raw fluorescence image sequence comprises S fluorescence images, S is an integer greater than or equal to 2, and each fluorescence image has a pixel size of M*N, with M and N being even numbers;

running a program in a computer for each of the J raw fluorescence image sequences, wherein the program is configured to:

(1) extract, by means of pixel realigning, a first sub-image, a second sub-image, a third sub-image, and a fourth sub-image each with a pixel size of (M/2)*(N/2) from an $i^{-th}$ fluorescence image among the S fluorescence images, wherein a two-dimensional (2D) pixel matrix $y_{i,(2m-1)(2n-1)}$ of the first sub-image, a 2D pixel matrix $y_{i,(2m-1)(2n)}$ of the second sub-image, a 2D pixel matrix $y_{i,(2m)(2n-1)}$ of the third sub-image, and a 2D pixel matrix $y_{i,(2m)(2n)}$ of the fourth sub-image are selected from a 2D pixel matrix $y_{i,MN}$ of the $i^{-th}$ fluorescence image respectively, where m is an integer and m=1, 2, 3, . . . , M/2, and n is an integer and n=1, 2, 3, . . . , N/2;

(2) perform 2× pixel upsampling on the first sub-image, the second sub-image, the third sub-image, and the fourth sub-image to obtain a first upsampled sub-image, a second upsampled sub-image, a third upsampled sub-image, and a fourth upsampled sub-image each with a pixel size of M*N;

(3) perform a pixel translation of [0.5, 0.5] on a 2D pixel matrix of the first upsampled sub-image to obtain a first 2D subpixel translated sub-image; perform a pixel translation of [−0.5, 0.5] on a 2D pixel matrix of the second upsampled sub-image to obtain a second 2D subpixel translated sub-image; perform a pixel translation of [0.5, −0.5] on a 2D pixel matrix of the third upsampled sub-image to obtain a third 2D subpixel translated sub-image; and perform a pixel translation of [−0.5, −0.5] on a 2D pixel matrix of the fourth upsampled sub-image to obtain a fourth 2D subpixel translated sub-image;

(4) group S first 2D subpixel translated sub-images obtained from the S fluorescence images into a first sub-image group, group S second 2D subpixel translated sub-images obtained from the S fluorescence images into a second sub-image group, group S third 2D subpixel translated sub-images obtained from the S fluorescence images into a third sub-image group, and group S fourth 2D subpixel translated sub-images obtained from the S fluorescence images into a fourth sub-image group;

(5) perform SIM reconstruction on the first sub-image group, the second sub-image group, the third sub-image group, and the fourth sub-image group using a standard SIM reconstruction algorithm, to obtain a first super-resolution sub-image, a second super-resolution sub-image, a third super-resolution sub-image, and a fourth super-resolution sub-image respectively; and (6) select two different super-resolution sub-images from the first super-resolution sub-image, the second super-resolution sub-image, the third super-resolution sub-image, and the fourth super-resolution sub-image to form a super-resolution image pair for training, and incorporate the super-resolution image pair for training into a training set; and running a program in a computer, where the program is configured to:

(7) train a denoising neural network based on the training set; and (8) perform super-resolution reconstruction on the S fluorescence images in each of the J raw fluorescence image sequences using a standard structured illumination super-resolution reconstruction algorithm, to form a super-resolution image, wherein the super-resolution image is input into the denoising neural network to obtain a final super-resolution reconstructed image.

2. The self-supervised multimodal structured illumination microscopic reconstruction method according to claim 1, wherein in a case where the denoising neural network is trained, one super-resolution sub-image in the super-resolution image pair for training serves as input data for training, and another super-resolution sub-image in the super-resolution image pair for training serves as target data for training.

3. The self-supervised multimodal structured illumination microscopic reconstruction method according to claim 2, further comprising:

in a case where the maximum number of pixels in a row direction and/or the maximum number of pixels in a column direction of the fluorescence image in the raw fluorescence image sequence is an odd number, removing a corresponding number of row pixels and/or column pixels to ensure that the maximum number of pixels in the row direction and the maximum number of pixels in the column direction of the fluorescence image are both even numbers.

4. The self-supervised multimodal structured illumination microscopic reconstruction method according to claim 1, wherein training the denoising neural network based on the training set comprises:

selecting one super-resolution image pair for training from the training set randomly during each training cycle;

extracting image patches at the same position randomly from the two super-resolution sub-images;

performing random rotation and flipping on the image patches to obtain an input image and a target image of the denoising neural network respectively; and calculating an error between a network output and the target image and back-propagating a gradient of the error to update a network parameter of the denoising neural network.

5. The self-supervised multimodal structured illumination microscopic reconstruction method according to claim 2, wherein training the denoising neural network based on the training set comprises:

selecting one super-resolution image pair for training from the training set randomly during each training cycle;

extracting image patches at the same position randomly from the two super-resolution sub-images;

performing random rotation and flipping on the image patches to obtain an input image and a target image of the denoising neural network respectively; and calculating an error between a network output and the target image and back-propagating a gradient of the error to update a network parameter of the denoising neural network.

6. The self-supervised multimodal structured illumination microscopic reconstruction method according to claim 3, wherein training the denoising neural network based on the training set comprises:

selecting one super-resolution image pair for training from the training set randomly during each training cycle;

extracting image patches at the same position randomly from the two super-resolution sub-images;

performing random rotation and flipping on the image patches to obtain an input image and a target image of the denoising neural network respectively; and calculating an error between a network output and the target image and back-propagating a gradient of the error to update a network parameter of the denoising neural network.

7. The self-supervised multimodal structured illumination microscopic reconstruction method according to claim 4, wherein the denoising neural network comprises at least one of a U-shaped neural network model, a residual neural network model, a residual channel attention convolutional neural network model, or a Fourier channel attention convolutional neural network model.

8. The self-supervised multimodal structured illumination microscopic reconstruction method according to claim 7, wherein an optical imaging system (100) is configured to excite the biological sample with structured illumination to obtain the J raw fluorescence image sequences generated by the exciting of the biological sample, wherein the optical imaging system (100) comprises a 2D structured illumination microscopy (2D-SIM) system, a three-dimensional SIM (3D-SIM) system, a lattice light-sheet SIM (LLS-SIM) system, or a grazing incidence illumination SIM (GI-SIM) system.

9. The self-supervised multimodal structured illumination microscopic reconstruction method according to claim 8, wherein the 2× pixel upsampling is implemented using nearest-neighbor interpolation, bilinear interpolation, or biquadratic spline interpolation.

10. A self-supervised multimodal structured illumination microscopic reconstruction system, comprising:

a super-resolution reconstruction module (210), configured to perform super-resolution reconstruction on an image using a standard structured illumination super-resolution reconstruction algorithm; and a denoising module (220), comprising a denoising neural network;

wherein the self-supervised multimodal structured illumination microscopic reconstruction system is configured to:

excite a biological sample with structured illumination to obtain J raw fluorescence image sequences generated by exciting of the biological sample, wherein J is an integer greater than or equal to 1, wherein each raw fluorescence image sequence comprises S fluorescence images, S is an integer greater than or equal to 2, and each fluorescence image has a pixel size of M*N, with M and N being even numbers;

wherein the self-supervised multimodal structured illumination microscopic reconstruction system is further configured to, for each of the J raw fluorescence image sequences:

(1) extract, by means of pixel realigning, a first sub-image, a second sub-image, a third sub-image, and a fourth sub-image each with a pixel size of (M/2)*(N/2) from an $i^{-th}$ fluorescence image among the S fluorescence images, wherein a two-dimensional (2D) pixel matrix $y_{i,(2m-1)(2n-1)}$ of the first sub-image, a 2D pixel matrix $y_{i,(2m-1)(2n)}$ of the second sub-image, a 2D pixel matrix $y_{i,(2m)(2n-1)}$ of the third sub-image, and a 2D pixel matrix $y_{i,(2m)(2n)}$ of the fourth sub-image are selected from a 2D pixel matrix $y_{i,\ MN}$ of the $i^{-th}$ fluorescence image respectively, where m is an integer and m=1, 2, 3, . . . , M/2, and n is an integer and n=1, 2, 3, . . . , N/2;

(2) perform 2× pixel upsampling on the first sub-image, the second sub-image, the third sub-image, and the fourth sub-image to obtain a first upsampled sub-image, a second upsampled sub-image, a third upsampled sub-image, and a fourth upsampled sub-image each with a pixel size of M*N;

(3) perform a pixel translation of [0.5, 0.5] on a 2D pixel matrix of the first upsampled sub-image to obtain a first 2D subpixel translated sub-image; perform a pixel translation of [−0.5, 0.5] on a 2D pixel matrix of the second upsampled sub-image to obtain a second 2D subpixel translated sub-image; perform a pixel translation of [0.5, −0.5] on a 2D pixel matrix of the third upsampled sub-image to obtain a third 2D subpixel translated sub-image; and perform a pixel translation of [−0.5, −0.5] on a 2D pixel matrix of the fourth upsampled sub-image to obtain a fourth 2D subpixel translated sub-image;

(4) group S first 2D subpixel translated sub-images obtained from the S fluorescence images into a first sub-image group, group S second 2D subpixel translated sub-images obtained from the S fluorescence images into a second sub-image group, group S third 2D subpixel translated sub-images obtained from the S fluorescence images into a third sub-image group, and group S fourth 2D subpixel translated sub-images obtained from the S fluorescence images into a fourth sub-image group;

(5) perform SIM reconstruction on the first sub-image group, the second sub-image group, the third sub-image group, and the fourth sub-image group using a standard SIM reconstruction algorithm, to obtain a first super-resolution sub-image, a second super-resolution sub-image, a third super-resolution sub-image, and a fourth super-resolution sub-image respectively; and (6) select two different super-resolution sub-images from the first super-resolution sub-image, the second super-resolution sub-image, the third super-resolution sub-image, and the fourth super-resolution sub-image to form a super-resolution image pair for training, and incorporate the super-resolution image pair for training into a training set; and wherein the self-supervised multimodal structured illumination microscopic reconstruction system is further configured to:

(7) train a denoising neural network based on the training set; and (8) perform super-resolution reconstruction on the S fluorescence images in each of the J raw fluorescence image sequences using a standard structured illumination super-resolution reconstruction algorithm, to form a super-resolution image, wherein the super-resolution image is input into the denoising neural network to obtain a final super-resolution reconstructed image.

11. The self-supervised multimodal structured illumination microscopic reconstruction system according to claim 10, wherein in a case where the denoising neural network is trained, one super-resolution sub-image in the super-resolution image pair for training serves as input data for training, and another super-resolution sub-image in the super-resolution image pair for training serves as target data for training.

12. The self-supervised multimodal structured illumination microscopic reconstruction system according to claim 11, further configured to:

in a case where the maximum number of pixels in a row direction and/or the maximum number of pixels in a column direction of the fluorescence image in the raw fluorescence image sequence is an odd number, remove a corresponding number of row pixels and/or column pixels to ensure that the maximum number of pixels in the row direction and the maximum number of pixels in the column direction of the fluorescence image are both even numbers.

13. The self-supervised multimodal structured illumination microscopic reconstruction system according to claim 10, further configured to, in a case of training the denoising neural network based on the training set:

select one super-resolution image pair for training randomly from the training set during each training cycle;

extract image patches at the same position randomly from the two super-resolution sub-images;

perform random rotation and flipping on the image patches to obtain an input image and a target image of the denoising neural network respectively; and calculate an error between a network output and the target image, and back-propagate a gradient of the error to update a network parameter of the denoising neural network.

14. The self-supervised multimodal structured illumination microscopic reconstruction system according to claim 11, further configured to, in a case of training the denoising neural network based on the training set:

select one super-resolution image pair for training randomly from the training set during each training cycle;

extract image patches at the same position randomly from the two super-resolution sub-images;

perform random rotation and flipping on the image patches to obtain an input image and a target image of the denoising neural network respectively; and calculate an error between a network output and the target image, and back-propagate a gradient of the error to update a network parameter of the denoising neural network.

15. The self-supervised multimodal structured illumination microscopic reconstruction system according to claim 12, further configured to, in a case of training the denoising neural network based on the training set:

select one super-resolution image pair for training randomly from the training set during each training cycle;

extract image patches at the same position randomly from the two super-resolution sub-images;

perform random rotation and flipping on the image patches to obtain an input image and a target image of the denoising neural network respectively; and calculate an error between a network output and the target image, and back-propagate a gradient of the error to update a network parameter of the denoising neural network.

16. The self-supervised multimodal structured illumination microscopic reconstruction system according to claim 13, wherein the denoising neural network comprises at least one of a U-shaped neural network model, a residual neural network model, a residual channel attention convolutional neural network model, or a Fourier channel attention convolutional neural network model.

17. The self-supervised multimodal structured illumination microscopic reconstruction system according to claim 16, further configured to use an optical imaging system (100) to excite the biological sample with structured illumination to obtain the J raw fluorescence image sequences generated by the exciting of the biological sample, wherein the optical imaging system (100) comprises a 2D structured illumination microscopy (2D-SIM) system, a three-dimensional SIM (3D-SIM) system, a lattice light-sheet SIM (LLS-SIM) system, or a grazing incidence illumination SIM (GI-SIM) system.

18. The self-supervised multimodal structured illumination microscopic reconstruction system according to claim 17, wherein the 2× pixel upsampling is implemented using nearest-neighbor interpolation, bilinear interpolation, or biquadratic spline interpolation.

\* \* \* \* \*